(12) United States Patent
Hong et al.

(10) Patent No.: US 9,368,251 B2
(45) Date of Patent: Jun. 14, 2016

(54) MULTILAYER CERAMIC CAPACITOR WITH CONDUCTIVE FULLERENE-FILLING RESIN LAYER, METHOD FOR SAME, AND MOUNTING BOARD WITH SAME

(71) Applicant: SAMSUNG ELECTRO-MECHANICS CO., LTD., Suwon-Si, Gyeonggi-Do (KR)

(72) Inventors: Kyung Pyo Hong, Suwon-Si (KR); Doo Young Kim, Suwon-Si (KR); Chang Hoon Kim, Suwon-Si (KR); Sang Hyun Park, Suwon-Si (KR); Hae Sock Chung, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 188 days.

(21) Appl. No.: 14/196,911

(22) Filed: Mar. 4, 2014

(65) Prior Publication Data

US 2015/0170786 A1 Jun. 18, 2015

(30) Foreign Application Priority Data

Dec. 12, 2013 (KR) .................. 10-2013-0154480

(51) Int. Cl.
| | | |
|---|---|---|
| *H01B 1/24* | (2006.01) | |
| *H01B 1/02* | (2006.01) | |
| *H01G 2/06* | (2006.01) | |
| *H01G 4/12* | (2006.01) | |
| *H01G 4/30* | (2006.01) | |
| *H01G 4/232* | (2006.01) | |

(52) U.S. Cl.
CPC .. *H01B 1/24* (2013.01); *H01B 1/02* (2013.01); *H01G 2/065* (2013.01); *H01G 4/232* (2013.01); *H01G 4/2325* (2013.01); *H01G 4/30* (2013.01); *H01G 4/12* (2013.01)

(58) Field of Classification Search
None
See application file for complete search history.

(56) References Cited

U.S. PATENT DOCUMENTS

| | | | | |
|---|---|---|---|---|
| 2015/0068794 A1* | 3/2015 | Kang | .............. | H01G 4/232 174/260 |
| 2015/0170786 A1* | 6/2015 | Hong | .............. | H01B 1/02 174/260 |
| 2015/0187500 A1* | 7/2015 | Kang | .............. | H01G 4/30 174/260 |

FOREIGN PATENT DOCUMENTS

| | | |
|---|---|---|
| KR | 10-2005-0102767 A | 10/2005 |
| KR | 10-20100110891 A | 10/2010 |

* cited by examiner

*Primary Examiner* — Jeremy C Norris
*Assistant Examiner* — Muhammed Azam
(74) *Attorney, Agent, or Firm* — McDermott Will & Emery LLP

(57) ABSTRACT

A multilayer ceramic capacitor includes a ceramic body including dielectric layers and internal electrodes, electrode layers connected to the internal electrodes, and a conductive resin layer formed on the electrode layer and containing conductive particles, fullerenes, and a base resin.

14 Claims, 5 Drawing Sheets

A - A'

MULTILAYER CERAMIC CAPACITOR WITH CONDUCTIVE FULLERENE-FILLING RESIN LAYER, METHOD FOR SAME, AND MOUNTING BOARD WITH SAME

CROSS-REFERENCE TO RELATED APPLICATION

This application claims the benefit of Korean Patent Application No. 10-2013-0154480 filed on Dec. 12, 2013, with the Korean Intellectual Property Office, the disclosure of which is incorporated herein by reference.

BACKGROUND

The present disclosure relates to a multilayer ceramic capacitor, a manufacturing method thereof, and a mounting board for a multilayer ceramic capacitor.

Among ceramic electronic components, multilayer ceramic capacitors include a plurality of multilayer dielectric layers, internal electrodes disposed to face each other, having the dielectric layer therebetween, and external electrodes electrically connected to the internal electrodes.

Multilayer ceramic capacitors have been widely used as components for a mobile communications device such as computers, personal digital assistances (PDAs), mobile phones, or the like, due to advantages such as a small size, high capacitance, easiness of mounting, or the like.

Recently, as electronic products have been miniaturized and multi-functionalized, chip components have also tended to be miniaturized and multi-functionalized, and therefore, multilayer ceramic capacitors have also been demanded to have a small size and large capacitance.

To this end, multilayer ceramic capacitors including dielectric layers and internal electrode layers having relatively reduced thicknesses to be able to have a relatively large amount of layers stacked therein have been manufactured, and thus, external electrodes have also been thinned.

In addition, as many functions used in fields requiring high reliability such as for vehicles and medical devices are digitalized and the demand therefor is increased, a demand for high reliability multilayer ceramic capacitors has also increased.

Factors causing problems in terms of high reliability may include infiltration of a plating solution, occurrence of cracks due to external shock, and the like, occurring during manufacturing processes.

In order to solve the above-described problems, a resin composition containing a conductive material is applied to electrode layers of external electrodes to absorb external shock and prevent a plating solution from being infiltrated, thereby improving reliability.

However, in a case in which a conductive resin layer is applied to electrode layers, equivalent series resistance (ESR) may be increased. Therefore, multilayer ceramic capacitors having decreased ESR have been demanded.

RELATED ART DOCUMENT

Korean Patent No. KR10-0586962

SUMMARY

An aspect of the present disclosure may provide a multilayer ceramic capacitor, a manufacturing method thereof, and a mounting board for a multilayer ceramic capacitor.

According to an aspect of the present disclosure, a multilayer ceramic capacitor may include: a ceramic body including dielectric layers and internal electrodes; electrode layers connected to the internal electrodes; and a conductive resin layer formed on the electrode layer and containing conductive particles, fullerenes, and a base resin.

An area ratio between the conductive particles and the fullerenes measured, taken in a cross section of the conductive resin layer may be 100:1 to 100:85.

The fullerene may include one or more C60, C70, C76, C78, C82, C90, C94 or C96 molecule.

The conductive particle may have a spherical shape or a flake shape.

When the conductive particle and the fullerene contained in the conductive resin layer are defined as conductors, an area ratio between the conductors and the base resin taken in a cross section of the conductive resin layer may be 100:18 to 100:61.

The base resin may be a thermosetting resin.

The multilayer ceramic capacitor may further include a plating layer formed on the conductive resin layer.

According to another aspect of the present disclosure, a manufacturing method of a multilayer ceramic capacitor may include: forming a ceramic body including dielectric layers and internal electrodes; forming electrode layers so as to be connected to the internal electrodes; applying a conductive paste containing conductive particles, fullerenes, and a base resin to the electrode layer; and forming a conductive resin layer by curing the conductive paste.

The manufacturing method may further include, after the forming of the conductive resin layer, forming a plating layer on the conductive resin layer.

According to another aspect of the present disclosure, a mounting board for a multilayer ceramic capacitor may include: a printed circuit board having first and second electrode pads disposed on the printed circuit board; and a multilayer ceramic capacitor installed on the printed circuit board, wherein the multilayer ceramic capacitor includes a ceramic body including dielectric layers and internal electrodes; electrode layers connected to the internal electrodes; a conductive resin layer formed on the electrode layer and containing conductive particles, fullerenes, and a base resin, and a plating layer formed on the conductive resin layer.

An area ratio between the conductive particles and the fullerenes measured, taken in a cross section of the conductive resin layer may be 100:1 to 100:85.

The fullerene may include one or more C60, C70, C76, C78, C82, C90, C94 or C96 molecule.

The conductive particle may have a spherical shape or a flake shape.

When the conductive particle and the fullerene contained in the conductive resin layer are defined as conductors, an area ratio between the conductors and the base resin taken in a cross section of the conductive resin layer may be 100:18 to 100:61.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
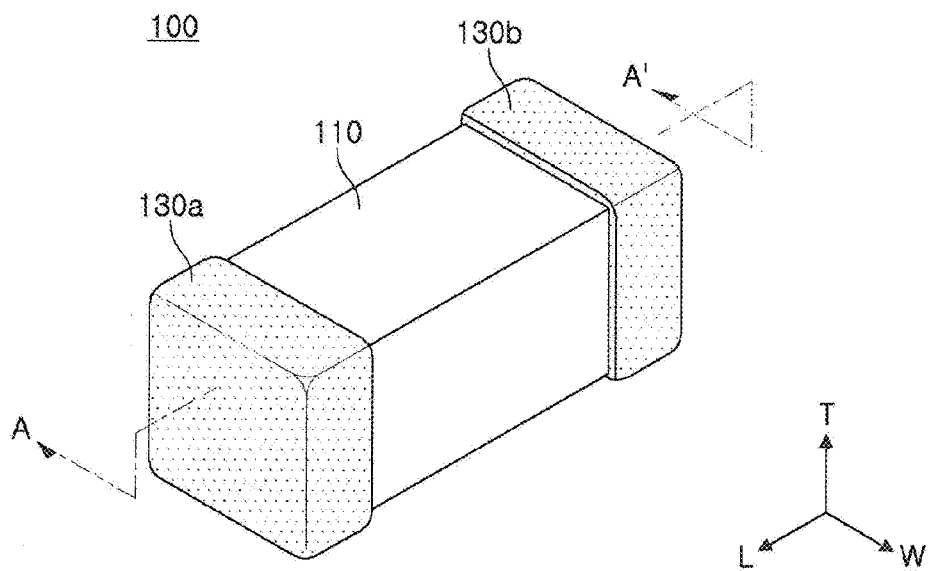
FIG. 1 is a perspective view showing a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Capacitor

Figure 2:
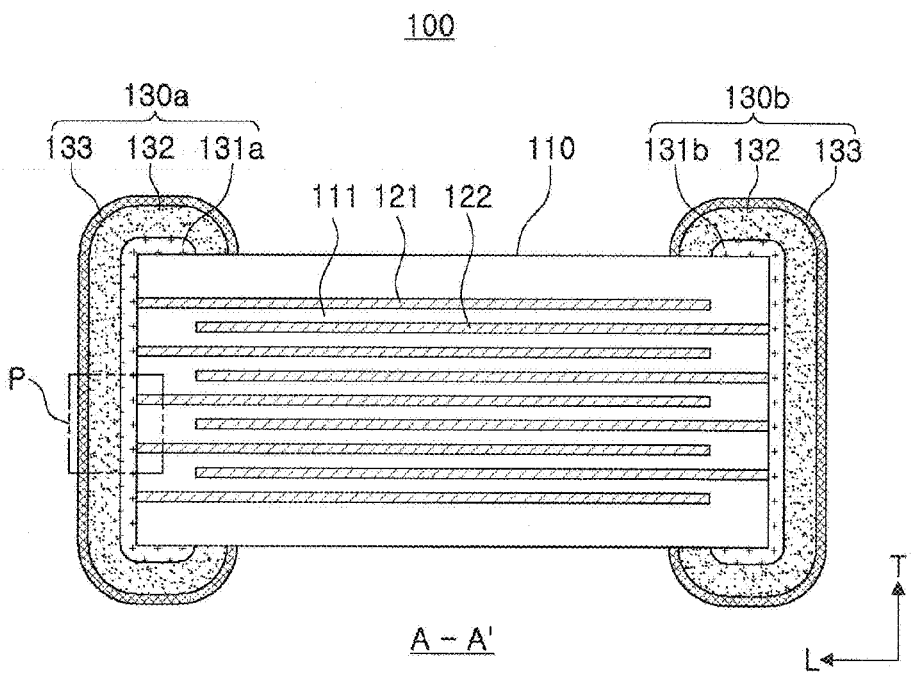
FIG. 2 is a cross-sectional view taken along line A-A' of FIG. 1.

FIG. 1 is a perspective view showing a multilayer ceramic capacitor 100 according to an exemplary embodiment of the present disclosure, and FIG. 2 is a cross-sectional view taken along line A-A' of FIG. 1.

Figure 3:
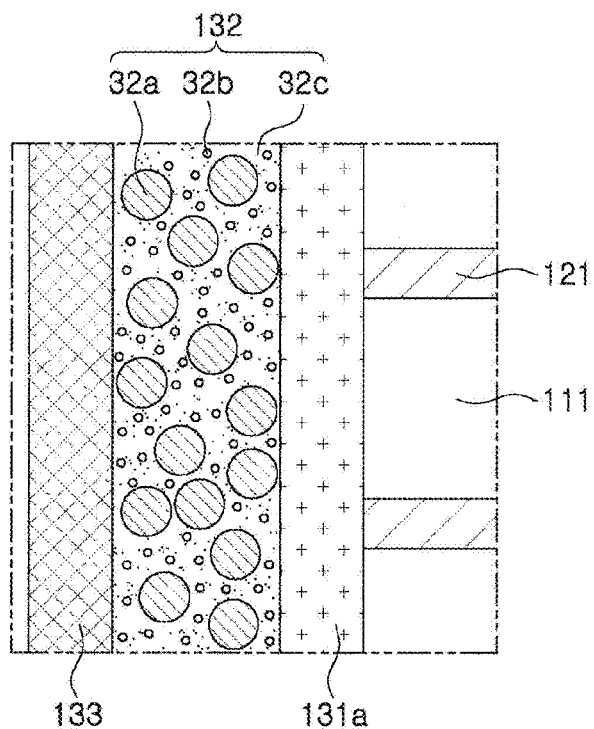
FIG. 3 is an enlarged view of region P of FIG. 2.

FIG. 3 is an enlarged view of region P of FIG. 2.

Referring to FIGS. 1 and 2, a multilayer ceramic capacitor 100 according to an exemplary embodiment of the present disclosure may include a ceramic body 110 and external electrodes 130a and 130b.

The ceramic body 110 may include an active layer as a part contributing to forming capacitance of the capacitor and upper and lower cover layers formed on upper and lower parts of the active layer as upper and lower margin parts, respectively. The active layer may include a dielectric layer 111 and internal electrodes 121 and 122.

In the exemplary embodiment of the present disclosure, the ceramic body 110 may have a substantially hexahedral shape, but is not particularly limited in view of a shape. Due to sintering shrinkage of ceramic powder particle at the time of sintering the chip, difference in the thickness depending on the presence or absence of internal electrode patterns, and abrasion of an edge part of the ceramic body, the ceramic body 110 may not have a perfect hexahedral shape, but may have a shape similar to the hexahedral shape.

Directions in a hexahedron will be defined in order to clearly describe the embodiments of the present disclosure. L, W and T shown in the drawings refer to a length direction, a width direction, and a thickness direction, respectively. Here, the thickness direction may be defined as the same as a direction in which the dielectric layers are stacked.

The internal electrodes 121 and 122 may include a first internal electrode 121 and a second internal electrode 122, wherein the first and second internal electrodes may be disposed to face each other, having the dielectric layer 111 therebetween. The first and second internal electrodes 121 and 122, a pair of electrodes having different polarities, may be formed in a stacked direction of the dielectric layers 111 so as to be alternately exposed through both end surfaces of the ceramic body by printing a conductive paste including a conductive metal on the dielectric layer 111 to be a predetermined thickness, and may be electrically insulated from each other by the dielectric layer 111 disposed therebetween.

For example, the first and second internal electrodes 121 and 122 may be electrically connected to the external electrodes 130a and 130b through portions of the first and second internal electrodes alternately exposed through both end surfaces of the ceramic body 110. In detail, the external electrode may include a first external electrode 130a and a second external electrode 130b, and the first internal electrode may be electrically connected to the first external electrode 130a and the second internal electrode may be electrically connected to the second external electrode 130b.

Therefore, in the case in which voltage is applied to the first and second external electrodes 130a and 130b, electric charges are accumulated between the first and second internal electrodes 121 and 122 facing each other. Here, capacitance of the multilayer ceramic capacitor 100 is in proportion to an area of a region in which the first and second internal electrodes 121 and 122 are overlapped with each other.

A thickness of the first and second internal electrodes 121 and 122 may be determined depending on the use thereof.

In addition, the conductive metal included in the first and second internal electrodes 121 and 122 may be nickel (Ni), copper (Cu), palladium (Pd), or an alloy thereof, but the present disclosure is not limited thereto.

Here, a thickness of the dielectric layer 111 may be arbitrarily changed depending on a capacitance design of the multilayer ceramic capacitor.

In addition, the dielectric layer 111 may include a ceramic powder having high dielectric constant, for example, a barium titanate ($BaTiO_3$)-based powder, or a strontium titanate ($SrTiO_3$)-based powder. However, the present disclosure is not limited thereto.

The upper and lower cover layers may have the same material and configuration as those of the dielectric layer 111 except for not including the internal electrode. The upper and lower cover layers may be formed by stacking a single dielectric layer or two or more dielectric layers on upper and lower surfaces of the active layer in a vertical direction, respectively, and may basically prevent damage of the first and second internal electrodes 121 and 122 due to physical or chemical stress.

The external electrodes 130a and 130b may include electrode layers 131a and 131b and a conductive resin layer 132 formed on the electrode layers.

For example, the first external electrode 130a may include a first electrode layer 131a and a conductive resin layer 132, and the second external electrode 130b may include a second electrode layer 131b and a conductive resin layer 132.

The first and second electrode layers 131a and 131b may be directly connected to the first and second internal electrodes 121 and 122, respectively, to secure an electrical connection between the external electrode and the internal electrode.

The first and second electrode layers 131a and 131b may include a conductive metal, and the conductive metal may be nickel (Ni), copper (Cu), palladium (Pd), gold (Au), or an alloy thereof, but the present disclosure is not limited thereto.

The first and second electrode layers 131a and 131b may be a sintered type electrode formed by sintering a paste containing the conductive metal.

The conductive resin layer 132 may be disposed on the first and second electrode layers 131a and 131b.

For example, the first and second electrode layers may be disposed on an outer surface of the ceramic body, and the conductive resin layer 132 may be disposed on an outer side of the first and second electrode layers.

A direction in which the ceramic body 110 is disposed is defined as being inward and a direction in which the ceramic body 110 is not disposed is defined as being outward, based on the external electrode in the present disclosure.

FIG. 3 is an enlarged view of region P of FIG. 2, and as shown in FIG. 3, the conductive resin layer 132 may contain conductive particles 32a, fullerenes 32b, and a base resin 32c.

The conductive particle 32a may be a metal particle containing at least one of copper (Cu), silver (Ag), nickel (Ni), or alloys thereof, and may have a spherical shape or a flake shape, but the present disclosure is not limited thereto.

The conductive particle 32a may have a particle size larger than that of fullerene 32b, and a particle size of the conductive particle may be 3 μm to 7 μm, but the present disclosure is not limited thereto.

Figure 4:
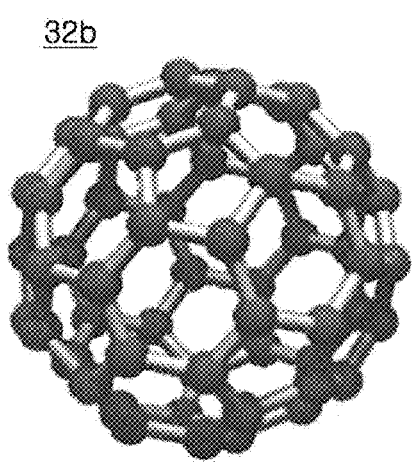
FIG. 4 schematically shows a structure of fullerene, one constitution of the present disclosure.

FIG. 4 schematically shows a structure of fullerene 32b contained in the conductive resin layer.

In FIG. 4, a spherical black particle indicates carbon atoms configuring fullerene, and a white bar visibly indicates a coupling between the carbon atoms.

As shown in FIG. 4, the fullerene may collectively indicate a molecule in which carbon atoms are connected to each other while having a soccer ball shape configured of regular pentagons or hexagons.

In an exemplary embodiment of the present disclosure, the fullerene may include one or more C60, C70, C76, C78, C82, C90, C94 or C96 molecule, but the present disclosure is not limited thereto.

The fullerene may have a particle size of 0.7 nm to 1.2 nm.

The fullerene may be attached around the conductive particle or may be disposed between the conductive particles to increase conductivity of the conductive resin layer.

Hereinafter, in the case in which the conductive resin layer is formed in a bimodal system containing conductors having the size of 2 or more, a conductor having a relatively large size is defined as a first conductor and a conductor having a smaller size than that of the first conductor is defined as a second conductor.

In the case in which the second conductor smaller than the first conductor is formed of metal particles and is contained in the conductive resin layer in order to improve conductivity of the conductive resin layer, due to a limitation in a particle size of the second conductor, electric conductivity of the conductive resin layer and equivalent series resistance (ESR) may not be sufficiently improved as compared to the present disclosure containing the second conductor formed of fullerene.

In the case in which the second conductor is formed of metal particles, the second conductor has a thinly oxidized film on a surface of the second conductor due to oxidation of the metal particles, and in the case in which the second conductor has a predetermined size or less, an inner portion of the second conductor may also be oxidized.

In other words, in the case in which a particle size of the second conductor formed of a metal is a predetermined level or lower, due to an oxidation of the second conductor, conductivity of the conductive resin layer may not be improved even in a case in which the second conductor is added to the conductive resin layer, and in the case in which a particle size is increased in order to prevent oxidation of the second conductor, an increase in points of contact between conductors may not be sufficient.

However, in the case in which the second conductor is formed of fullerene like the present disclosure, a significantly small sized second conductor may be added, such that points of contact between the conductors may be innumerably increased. For example, since fullerene has a particle size of around 1 nm and is not oxidized in air, the ESR of the conductive resin layer may be significantly increased as compared to the case in which the second conductor is formed of fine metal particles.

The base resin 32c may be a thermosetting resin, and may include an epoxy resin, but the present disclosure is not limited thereto.

The conductive resin layer may be formed on the electrode layers to prevent a plating solution from being infiltrated into the electrode layers and the ceramic body and may absorb physical shock from the outside, thereby protecting the multilayer ceramic capacitor.

Meanwhile, since the conductive resin layer contains the base resin, a problem in which electrical conductivity is relatively low as compared to the sintered type electrode layer may occur.

In detail, since the conductive resin layer has a current flow generated by a contact or a tunneling effect between conductors distributed in the base resin, as a content of the resin is increased, a problem in which equivalent series resistance (ESR) is also increased may occur.

In the case in which the content of the base resin contained in the conductive resin layer is decreased and the content of the conductor is increased, an ESR value may be slightly decreased; however, functions such as absorption of external shock and prevention of infiltration of a plating solution may be deteriorated.

However, the conductive resin layer contains fullerene according to the exemplary embodiment of the present disclosure, such that even in a case in which a predetermined level of the base resin for absorbing external shock and preventing a plating solution from being infiltrated is contained in the conductive resin layer, a small ESR value may be achieved.

In detail, fullerenes having a nano size are distributed between the conductive particles to improve the number of contacts between the conductors formed of conductive particles and fullerenes, thereby increasing a current path, such that the ESR may be significantly decreased.

In detail, since the fullerene has a nano size, in the case in which the fullerenes are mixed with conductive particles having a particle size larger than that of the fullerene, a filling rate of the conductive particles may be improved depending on a bimodal system theory.

The fullerene, a conductor configuring carbon chains, having a nano sized diameter, has a significantly small volume for one particle, such that even in a case in which the fullerene is contained in a relatively small volume rate, a number of fullerenes may be disposed between conductive particles, whereby a current flow channel (conductive channel) may be increased and ESR may be decreased.

In addition, even in a case in which the fullerenes are not in direct contact with the conductive particles, the fullerenes may be disposed between the conductive particles to increase a channel in which electrons are moved by a tunneling effect, such that ESR may be effectively decreased.

In further detail, an area ratio between the conductive particles and the fullerenes (conductive particle:fullerene) taken in a cross section of the conductive resin layer may be 100:1 to 100:85. In other words, an area ratio of the fullerenes to the conductive particles taken in a cross section of the conductive resin layer may be 1/100 to 85/100.

An area ratio of the fullerenes to the conductive particles may be measured in a cross section in a length-thickness direction, passing through the center in a width direction of the multilayer ceramic capacitor as shown in FIG. 2.

In the case in which an area ratio of the fullerenes to the conductive particles in a cross section of the conductive resin layer in a length-thickness direction of the multilayer ceramic capacitor is less than 1/100, the ESR may not be sufficiently decreased, and in the case in which the area ratio of the fullerenes to the conductive particles in a cross section of the conductive resin layer in a length-thickness direction of the multilayer ceramic capacitor is more than 85/100, a particle fraction of the fullerene having a relatively small size may be increased and an area of a base resin contacting the electrode layer on an interface between the electrode layer and the conductive resin layer may be decreased, such that a delamination defect between the electrode layer and the conductive resin layer may occur.

Therefore, an area ratio between the conductive particles and the fullerenes taken in a cross section of the conductive resin layer (conductive particle:fullerene) may be 100:1 to 100:85.

In further detail, in order to further decrease the ESR of the multilayer ceramic capacitor, an area ratio between the conductive particles and the fullerenes taken in a cross section of the conductive resin layer (conductive particle:fullerene) may satisfy 100:6 to 100:85.

According to an exemplary embodiment of the present disclosure, when the conductive particle and the fullerene contained in the conductive resin layer are defined as conductors, an area ratio between the conductors and the base resin taken in a cross section of the conductive resin layer (conductor:base resin) may be 100:18 to 100:61. In other words, an area ratio of the base resin to conductor particles taken in a cross section of the conductive resin layer may be 18/100 to 61/100.

In the case in which an area ratio of the base resin to the conductor particles is less than 18/100, a delamination defect may occur due to a lack of the base resin, and in the case in which an area ratio of the base resin to the conductor particles is more than 61/100, an ESR value may be increased.

According to an exemplary embodiment of the present disclosure, first and second external electrodes 130a and 130b may further include a plating layer 133 formed on the conductive resin layer.

The plating layer may include one or more plating layers selected from a nickel plating layer and a tin plaiting layer.

In an exemplary embodiment of the present disclosure, a nickel plating layer and a tin plating layer may be included, and the nickel plating layer may be disposed on the conductive resin layer and the tin plating layer may be disposed on the nickel plating layer.

According to the present disclosure, the conductive resin layer may contain the conductive particles and the fullerenes, such that the multilayer ceramic capacitor capable of absorbing shock, preventing a plating solution from being infiltrated, and decreasing equivalent series resistance (ESR) may be provided.

Manufacturing Method of Multilayer Ceramic Capacitor

Figure 5:
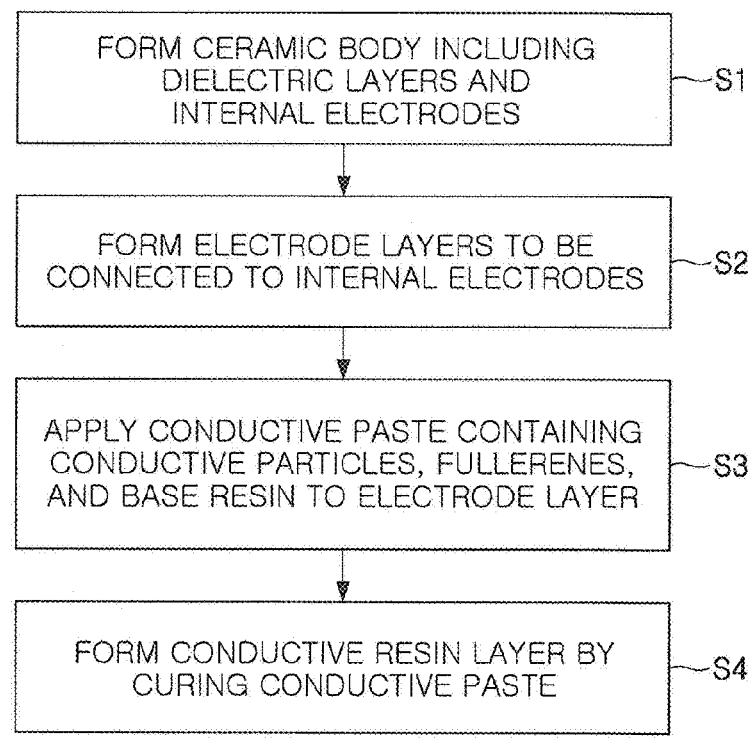
FIG. 5 is a manufacturing process diagram showing a manufacturing method of a multilayer ceramic capacitor according to another exemplary embodiment of the present disclosure.

FIG. 5 is a manufacturing process diagram showing a manufacturing method of a multilayer ceramic capacitor according to another exemplary embodiment of the present disclosure.

Referring to FIG. 5, the manufacturing method of multilayer ceramic capacitor according to the exemplary embodiment of the present disclosure may include: forming a ceramic body including dielectric layers and internal electrodes (S1); forming electrode layers so as to be connected to the internal electrodes (S2); applying a conductive paste containing conductive particles, fullerenes, and a base resin on the electrode layer (S3); and forming a conductive resin layer by curing the conductive paste (S4).

Among descriptions of the manufacturing method of a multilayer ceramic capacitor according to the present embodiment, a description overlapped with that of the above-mentioned multilayer ceramic capacitor will be omitted.

In the manufacturing method of the multilayer ceramic capacitor according to the exemplary embodiment of the present disclosure, first, a slurry containing a powder such as a barium titanate ($BaTiO_3$) powder, or the like, may be applied to a carrier film to then be dried thereon to prepare a plurality of ceramic green sheets, thereby forming a dielectric layer and a cover layer.

The ceramic green sheet may be manufactured by mixing a ceramic powder, a binder, and a solvent to prepare a slurry, and forming the slurry as a sheet having a predetermined thickness by a doctor blade method.

Then, an internal electrode conductive paste including a metal powder may be prepared.

After the conductive paste for the internal electrode is applied to the green sheet by a screen printing method to form the internal electrode, the plurality of green sheets having the internal electrode printed thereon may be stacked, the plurality of green sheets not having the internal electrode printed thereon may be stacked on upper and lower surfaces of a laminate, and a sintering process may be performed to manufacture a ceramic body 110. The ceramic body may include the internal electrodes 121 and 122, the dielectric layers 111, and the cover layer, and the dielectric layer is formed by sintering the green sheet having the internal electrode thereon and the cover layer is formed by sintering the green sheet not having the internal electrode thereon.

The internal electrode may include first and second internal electrodes 121 and 122.

Electrode layers may be formed to be electrically connected to the internal electrodes.

In detail, the first and second electrode layers 131a and 131b may be formed on an outer surface of the ceramic body so as to be electrically connected to the first and second internal electrodes 121 and 122, respectively. The first and second electrode layers may be formed by sintering a paste including a conductive metal and glass.

The conductive metal may be one or more selected from a group consisting of copper (Cu), silver (Ag), nickel (Ni), and alloys thereof, and in further detail, copper (Cu) may be used as described above, but the present disclosure is not particularly limited.

The glass is not particularly limited, but may be a material having the same composition as glass used in manufacturing the external electrode of the general multilayer ceramic capacitor.

A conductive paste containing conductive particles, fullerenes, and a base resin may be applied to an external side of the first and second electrode layers.

The first conductive powder particle may have a spherical shape or a flake shape, and may include at least one of copper, silver, nickel, or alloys thereof, but is not limited thereto.

The fullerene may include one or more C60, C70, C76, C78, C82, C90, C94 or C96 molecule.

The base resin may be an epoxy resin, a thermosetting resin.

The conductive resin layer may be subjected to a thermosetting process to form the conductive paste.

In addition, a plating layer may be formed on the conductive resin layer.

Mounting Board for Multilayer Ceramic Capacitor

Figure 6:
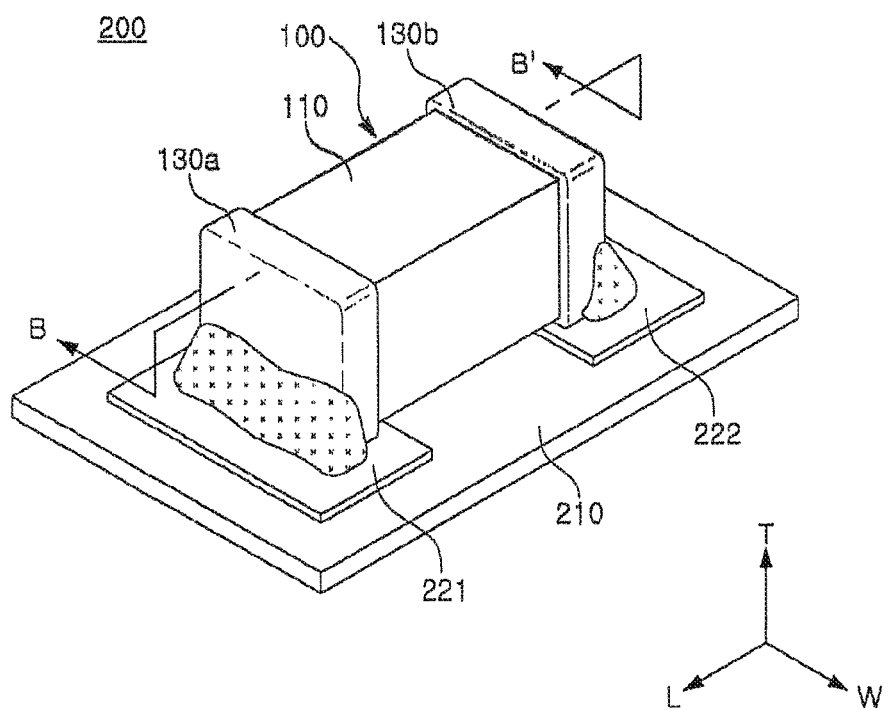
FIG. 6 is a perspective view showing a mounting board for a multilayer ceramic capacitor according to another exemplary embodiment of the present disclosure.
Figure 7:
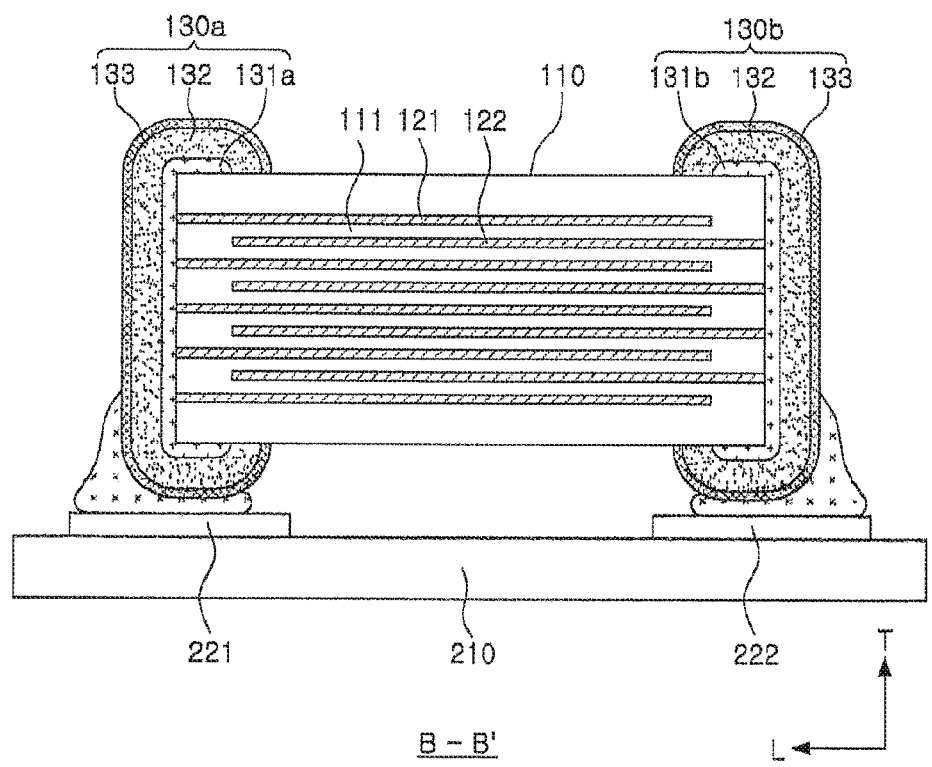
FIG. 7 is a cross-sectional view taken along line B-B' of FIG. 6.

FIG. 6 is a perspective view showing a mounting board for a multilayer ceramic capacitor according to another exemplary embodiment of the present disclosure, and FIG. 7 is a cross-sectional view taken along line B-B' of FIG. 6.

Referring to FIGS. 6 and 7, the mounting board 200 for the multilayer ceramic capacitor according to the present embodiment of the present disclosure may include: a printed circuit board 210 having first and second electrode pads 221 and 222 disposed thereon, and a multilayer ceramic capacitor 100 installed on the printed circuit board, and the multilayer ceramic capacitor includes a ceramic body including dielectric layers and internal electrodes; electrode layers connected to the internal electrodes; a conductive resin layer formed on the electrode layer and containing conductive particles, fullerenes, and a base resin, and a plating layer formed on the conductive resin layer.

A description of the mounting board for a multilayer ceramic capacitor overlapped with that of the above-mentioned multilayer ceramic capacitor will be omitted to avoid an overlapped description.

Experimental Example

A multilayer ceramic capacitor according to Experimental Example of the present disclosure was manufactured as follows.

First, a slurry containing a powder such as a barium titanate ($BaTiO_3$) powder, or the like, was applied to a carrier film to then be dried thereon to prepare a plurality of ceramic green sheets, thereby forming dielectric layers.

Then, a conductive paste for an internal electrode containing a nickel powder was prepared. The conductive paste for an internal electrode was applied to the green sheet by a screen printing method to thereby form an internal electrode and 100 or more layers of green sheets were then stacked to form a plurality of laminates.

Next, the laminates were compressed, cut, and sintered, thereby forming a ceramic body, and sintered type electrode layers were formed on an external surface of the ceramic body so as to be connected to the internal electrodes.

After a conductive resin layer containing conductive particles and fullerenes was formed on the electrode layer depending on an area ratio shown in the following Table 1 and a plating layer was formed on the conductive resin layer, a test of equivalent series resistance (ESR) and delamination defect was carried out depending on an area ratio of the fullerenes to the conductive particles taken in a cross section of the conductive resin layer (indicated by an area ratio in the following Table 1).

In Experimental Example of the following Table 1, a copper particle having a size of 4 μm was used as the conductive particle, C60 was used as fullerene, and an epoxy resin was used as the base resin.

In order to perform a delamination defect test, after the manufactured multilayer ceramic capacitor was deposited in a lead-bath at 300° C. for 10 seconds, whether delamination occurred between the electrode layer and the conductive resin layer of the external electrode was tested.

TABLE 1

| Sample | Area Ratio | Equivalent Series Resistance (ESR: mΩ) | ESR Decreasing Rate | Determination of Delamination defect |
|---|---|---|---|---|
| 1 | 0 | 155.5 | 0% | OK |
| 2 | 3/1000 | 148.2 | 5% | OK |

TABLE 1-continued

| Sample | Area Ratio | Equivalent Series Resistance (ESR: mΩ) | ESR Decreasing Rate | Determination of Delamination defect |
|---|---|---|---|---|
| 3 | 7/1000 | 132.7 | 15% | OK |
| 4 | 10/1000 | 80.9 | 48% | OK |
| 5 | 30/1000 | 72.1 | 54% | OK |
| 6 | 60/1000 | 30.2 | 81% | OK |
| 7 | 300/1000 | 24.9 | 84% | OK |
| 8 | 500/1000 | 21.2 | 86% | OK |
| 9 | 700/1000 | 19.6 | 87% | OK |
| 10 | 850/1000 | 18.7 | 88% | OK |
| 11 | 900/1000 | 17.5 | 89% | NG |
| 12 | 1000/1000 | 16.0 | 90% | NG |

It could be appreciated from Table 1 above that in samples 1 to 3 having an area ratio of the fullerenes to the conductive particles taken in a cross section of the conductive resin layer is less than 1/100, the ESR was not significantly decreased, but in samples having an area ratio of the fullerenes to the conductive particles taken in a cross section of the conductive resin layer is 1/100 or more, the ESR was significantly decreased.

In the case of samples 11 and 12, in which an area ratio of the fullerenes to the conductive particles is more than 85/100, the ESR was significantly decreased; however, a delamination defect between the electrode layer and the conductive resin layer occurred.

The following Table 2 shows comparison data among multilayer ceramic capacitors manufactured by the same method as Table 1 above and multilayer ceramic capacitors not using fullerenes but containing fine copper particles having a size of 300 nm with the same volume ratio as the fullerene in the conductive resin layer, in view of an ESR decreasing rate.

The ESR decreasing rate of the following Table 2 was measured depending on a volume ratio (indicated by a volume ratio in the following Table 2) occupied by fullerenes or fine copper particles having 300 nm in the entire conductive resin layer.

TABLE 2

| Sample | Volume Ratio (vol %) | ESR (mΩ) When Fine copper Powder Is Added | ESR (mΩ) When Fullerene Is Added | Ratio of ESR |
|---|---|---|---|---|
| 13 | 0 | 154.8 | 155.5 | 1 |
| 14 | 0.21 | 154.0 | 148.2 | 1.04 |
| 15 | 0.42 | 136.7 | 132.7 | 1.03 |
| 16 | 0.83 | 121.2 | 80.9 | 1.5 |
| 17 | 2.05 | 98.9 | 72.1 | 1.37 |
| 18 | 4.03 | 78.2 | 30.2 | 2.59 |
| 19 | 17.34 | 62.6 | 24.9 | 2.51 |

It can be appreciated from Table 2 that in the case of adding fullerenes, ESR may be decreased by a maximum of 2.59 times within the experimental range of Table 2 as compared to the case of adding fine copper particles to the conductive resin layer.

As set forth above, according to exemplary embodiments of the present disclosure, the multilayer ceramic capacitor capable of absorbing shock, preventing a plating solution from being infiltrated, and decreasing equivalent series resistance (ESR), the manufacturing method thereof, and the mounting board for a multilayer ceramic capacitor may be provided.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor comprising:
a ceramic body including dielectric layers and internal electrodes;
electrode layers connected to the internal electrodes; and
a conductive resin layer formed on the electrode layer and containing conductive particles, fullerenes, and a base resin.

2. The multilayer ceramic capacitor of claim 1, wherein an area ratio between the conductive particles and the fullerenes measured, taken in a cross section of the conductive resin layer is 100:1 to 100:85.

3. The multilayer ceramic capacitor of claim 1, wherein the fullerene includes one or more C60, C70, C76, C78, C82, C90, C94 or C96 molecule.

4. The multilayer ceramic capacitor of claim 1, wherein the conductive particle has a spherical shape or a flake shape.

5. The multilayer ceramic capacitor of claim 1, wherein when the conductive particle and the fullerene contained in the conductive resin layer are defined as conductors, an area ratio between the conductors and the base resin taken in a cross section of the conductive resin layer is 100:18 to 100:61.

6. The multilayer ceramic capacitor of claim 1, wherein the base resin is a thermosetting resin.

7. The multilayer ceramic capacitor of claim 1, further comprising a plating layer formed on the conductive resin layer.

8. A manufacturing method of a multilayer ceramic capacitor, the manufacturing method comprising:
forming a ceramic body including dielectric layers and internal electrodes;
forming electrode layers so as to be connected to the internal electrodes;
applying a conductive paste containing conductive particles, fullerenes, and a base resin to the electrode layer; and
forming a conductive resin layer by curing the conductive paste.

9. The manufacturing method of claim 8, further comprising, after the forming of the conductive resin layer, forming a plating layer on the conductive resin layer.

10. A mounting board for a multilayer ceramic capacitor, the mounting board comprising:
a printed circuit board having first and second electrode pads disposed on the printed circuit board; and
a multilayer ceramic capacitor installed on the printed circuit board,
wherein the multilayer ceramic capacitor includes a ceramic body including dielectric layers and internal electrodes; electrode layers connected to the internal electrodes; a conductive resin layer formed on the electrode layer and containing conductive particles, fullerenes, and a base resin, and a plating layer formed on the conductive resin layer.

11. The mounting board of claim 10, wherein an area ratio between the conductive particles and the fullerenes measured, taken in a cross section of the conductive resin layer is 100:1 to 100:85.

12. The mounting board of claim 10, wherein the fullerene includes one or more C60, C70, C76, C78, C82, C90, C94 or C96 molecule.

13. The mounting board of claim 10, wherein the conductive particle has a spherical shape or a flake shape.

14. The mounting board of claim 10, wherein when the conductive particle and the fullerene contained in the conductive resin layer are defined as conductors, an area ratio between the conductors and the base resin taken in a cross section of the conductive resin layer is 100:18 to 100:61.

* * * * *